(No Model.)
E. H. HEWINS.
DEVICE FOR GEARING ENGINE SHAFTS DIRECTLY TO THE DRIVEN MACHINE.
No. 388,415. Patented Aug. 28, 1888.
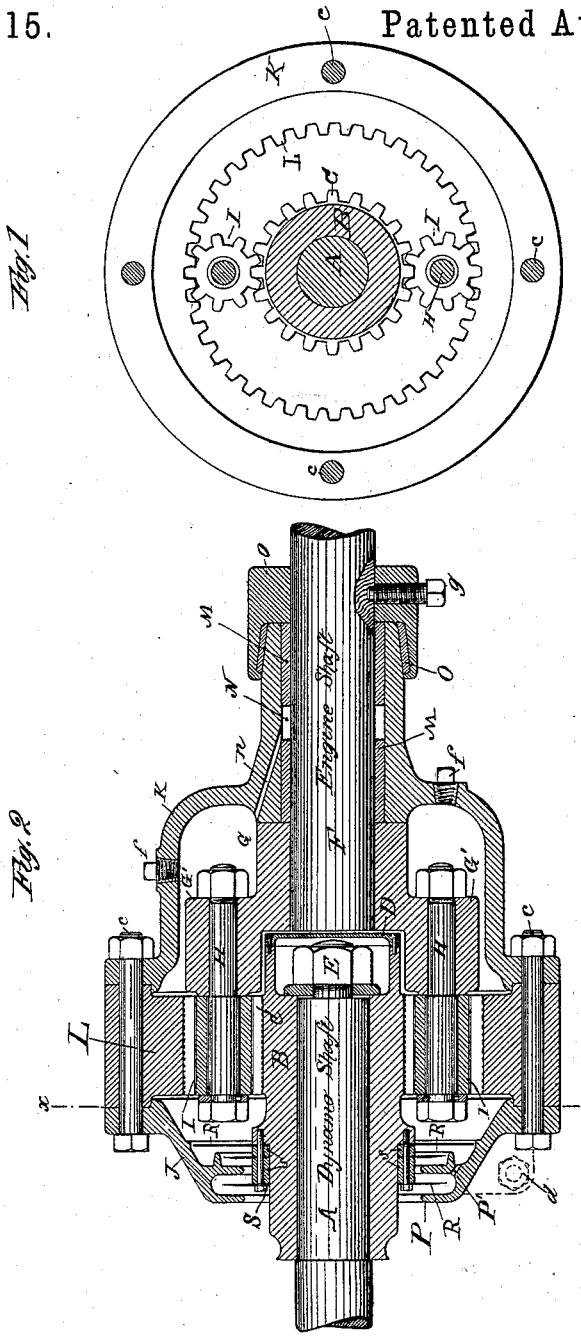
WITNESSES:
Raphael Netter
Robt. F. Gaylord
INVENTOR.
Edmund H. Hewins.
BY Duncan, Curtis & Page,
ATTORNEYS.

United States Patent Office.

EDMUND H. HEWINS, OF BOSTON, MASSACHUSETTS.

DEVICE FOR GEARING ENGINE-SHAFTS DIRECTLY TO THE DRIVEN MACHINE.

SPECIFICATION forming part of Letters Patent No. 388,415, dated August 28, 1888.

Application filed April 23, 1888. Serial No. 271,540. (No model.)

*To all whom it may concern:*

Be it known that I, EDMUND H. HEWINS, a citizen of the United States, residing at Boston, in the county of Suffolk and State of Massachusetts, have invented certain new and useful Improvements in Devices for Gearing Engine-Shafts Directly to the Driven Machine, of which the following is a specification, reference being had to the drawings accompanying and forming a part of the same.

It is often desirable to couple the shaft of a driven machine directly to the driving-shaft of an engine or other motor. This is particularly the case with dynamo-electric machines when currents of great steadiness are required; but in such instances it is necessary to run the engine or motor at a high rate of speed, as almost all dynamos, unless driven at a high speed, are very inefficient.

The object of this invention is to secure the advantages of a positive or direct connection between the engine and the dynamo or other driven machine, and at the same time to provide a means for multiplying the speed of the engine-shaft, so that a high and efficient speed may be imparted to the generator by a moderate speed of the engine.

In carrying out my invention I mount the engine and the dynamo so that their shafts shall be in alignment. On the dynamo-shaft I secure a gear which is surrounded by a stationary annular gear, and between these, and meshing with both, are two or more intermediate gears mounted loosely on spindles set in or forming part of a casting or hub keyed to the engine-shaft. I inclose the gears with a casing or box for containing oil, and provided with a means of preventing the escape of the oil.

The relative sizes and pitch of the several gears will be varied according to circumstances and the relative speeds required; but my object is generally to so proportion the gears as to impart to the dynamo a speed from twice to three times as great as that of the engine-shaft.

In the drawings hereto annexed I have shown neither the engine nor the dynamo, as their particular construction is largely immaterial and is well known; but in Figure 1 I have shown a cross-section of the gears on line *x x* of Fig. 2, and in Fig. 2 a longitudinal central section of the gears and the ends of the two shafts.

A designates the end of the shaft of a machine to be driven—such as a dynamo-electric machine. Over the end of this shaft and keyed thereto is a sleeve or hub, B, provided near its outer end with a gear, C. The end of the sleeve B extends beyond the end of the shaft A, and forms a chamber which is closed by a brass plate, D, and contains a nut, E, such as is commonly employed for securing pulleys and the like.

F is the end of the motor or engine shaft, and G a hub keyed or driven on it.

H H are two studs or spindles carried by the ears G', and upon which turn freely the small pinion-gears I I. These gears mesh with the gear C on opposite sides. Surrounding and inclosing these gears is a box or case formed by the two parts J and K, and an annular casting, L, secured together by bolts *c c*, and held against movement by the bolt *d*, which is to connect the case to any suitable stationary support.

The part L is provided on its interior with cogs forming an internal gear with which the pinions I I engage.

In order that the shaft F may turn freely within the case K, a bearing is formed by the sleeves M, of soft metal, between which is an oil space or chamber, N, communicating with the interior of the case by a passage, *n*. An end cap, O, is secured to shaft F by set-screw *g*, and extends over the end of the case K. A packing, *o*, of felt or similar material, is placed between the cap and the case K to prevent the escape of oil. Openings in the case for introducing and withdrawing oil are shown at *f f*. The part J is formed with an inwardly-extending flange, P, and a second inner flange or rib, P', and a passage is drilled through the rib P' to permit any oil that may accumulate between P and P' to run back into the casing.

Several disks of sheet metal or the like, R R R, are strung over the hub B and separated by washers *s*. These are held in place against a shoulder on the hub by means of screw-bolts S S. The diameter of these disks being nearly equal to the internal diameters of those portions of the case in which they are held, they serve as dams to prevent the escape of oil from the case.

The closing of the oil-chamber may be effected in any other way; but this device I have found in practice to give good results.

In the operation of this device the pinions I I are carried by the spindles H H around the shaft A; but by this revolution they are carried, by reason of their engagement with the gear L, to rotate about the spindles H, and they thus impart movement to the shaft A through gear C, which will rotate obviously at a considerably higher speed than the shaft F. The drawings in this case represent the proportions by a set of gears which multiplies the speed of shaft F nearly three times. The chamber formed by the casing formed by the parts J, K, and L is partially filled with oil when used, which, being confined, will last a long time.

This device used in this combination secures very useful results. By its adoption the motion of an engine is transmitted evenly and smoothly to a dynamo, space is economized, and the dynamo is run more economically than by a direct connection. The dynamo in this case runs practically as a fly-wheel.

I do not claim herein the construction of the gears proper; but

What I claim is—

1. The combination, with the shafts of a motor and a dynamo-electric machine, of a set of gears connecting the same and consisting of a gear on the dynamo-shaft, a stationary internal gear surrounding it, and intermediate loosely-mounted pinions carried by the engine-shaft, as herein set forth, whereby the two shafts are maintained in alignment and the dynamo driven at a higher speed than the engine.

2. The combination, with a dynamo-shaft having a gear, C, an engine-shaft carrying the loosely-mounted pinions I I, engaging therewith, and a stationary surrounding casing or box forming an oil-chamber and provided with an internal gear, L, with which the pinions engage, as set forth.

3. The combination, with the shaft of a dynamo-machine, and the hub B, secured thereto and provided with a gear, C, of an engine-shaft in alignment therewith, a hub, G, secured thereon, pinion-gears I, carried by the hub and engaging with the gear C, and an inclosing stationary box or casing forming an oil-chamber and provided with the internal gear, L, with which the pinions engage, as set forth.

4. The combination, with the driving-shaft of an engine and the shaft of a dynamo-electric machine in alignment therewith, of a system of multiplying gears mounted concentrically with the said shafts and connected to them so as to drive the dynamo-shaft at a higher speed than the engine-shaft, as herein set forth.

EDMUND H. HEWINS.

Witnesses:
WILLIAM L. STEVENS,
JOHN H. ALLEY.